Oct. 13, 1942.                I. WILLIAMS                2,298,325
                   SYSTEM FOR MAKING CARBON BLACK
                        Filed Oct. 3, 1939

IRA WILLIAMS.
INVENTOR.
BY
ATTORNEYS.

Patented Oct. 13, 1942

2,298,325

UNITED STATES PATENT OFFICE 2,298,325

SYSTEM FOR MAKING CARBON BLACK

Ira Williams, Borger, Tex., assignor to J. M. Huber Corporation, Borger, Tex., a corporation of Delaware Application October 3, 1939, Serial No. 297,638

3 Claims. (Cl. 23—259.5)

This invention relates to apparatus for use in handling so-called "sour" gases and has for its general object the provision of such apparatus which will not deteriorate rapidly, even when used under temperatures considerably above normal atmospheric temperatures. More specifically, it is an object of this invention to provide an apparatus which may be used in handling and burning sour gases for the production of carbon black by the so-called impingement process, and which will not deteriorate rapidly in such use.

The "sour" gases referred to are those containing sulphur compounds such as hydrogen sulphide which are known to cause rapid deterioration of iron and similar materials.

In the production of carbon black by the so-called impingement process, hydrocarbon gases are passed through burner tips of suitable material such as lava or porcelain and burned with a controlled amount of oxygen. The burner tips are appropriately located below a surface upon which the flame and products of combustion impinge and upon which the carbon black is deposited. This burning takes place within an enclosure which in one form of apparatus is termed a "hot house," so that the supply of air to the flame may be controlled. Within this enclosure, temperatures much higher than normal atmospheric temperatures prevail, these temperatures usually ranging between 400 and 600 degrees centigrade.

It is of course necessary that at least a portion of the distribution system for conducting and distributing the gas to the burner tips be positioned within the hot house or other enclosure and hence subject to the temperatures referred to.

Heretofore the distribution systems for conducting the gases to the burner tips have been made of various materials but principally of iron. When the gas being used is a sweet gas, or one not containing the destructive sulphur compounds referred to, these iron distribution systems have been found to be very satisfactory and to last for years. However, the use of sour gas for making carbon black has for a number of reasons greatly increased in recent years. In some localities the use of sweet gas for making carbon black is prohibited by law for conservation purposes. When an iron distribution system such as above referred to is used with sour gas under the conditions prevailing in a hot house in the production of carbon black, it has been found that a rapid deterioration of the distributing pipes takes place with a consequent loss of production due to stoppage of the pipes and with a consequent increase in expense due to necessity for frequent and costly replacement. A vast amount of experimentation and research in an effort to solve this problem has previous to this invention proved unavailing.

It is therefore an object of this invention to provide a distributing system which will not be subject to rapid deterioration when used with sour gas.

A further object is to provide a distributing system which will not become clogged by deposits within the system and which will exert substantially no influence upon the hydrocarbon gas carried thereby.

A still further object is to provide a more efficient apparatus for the production of carbon black.

The foregoing objects may be accomplished by the construction of the distributing system of a material which is capable of retaining a polished heat reflecting surface in the presence of gases containing sulphur, and which will exert substantially no catalytic effect on the thermal decomposition of the hot hydrocarbon gases.

The accompanying drawing illustrates one form of apparatus to which the present invention may be applied. In this drawing.

Figure 1:
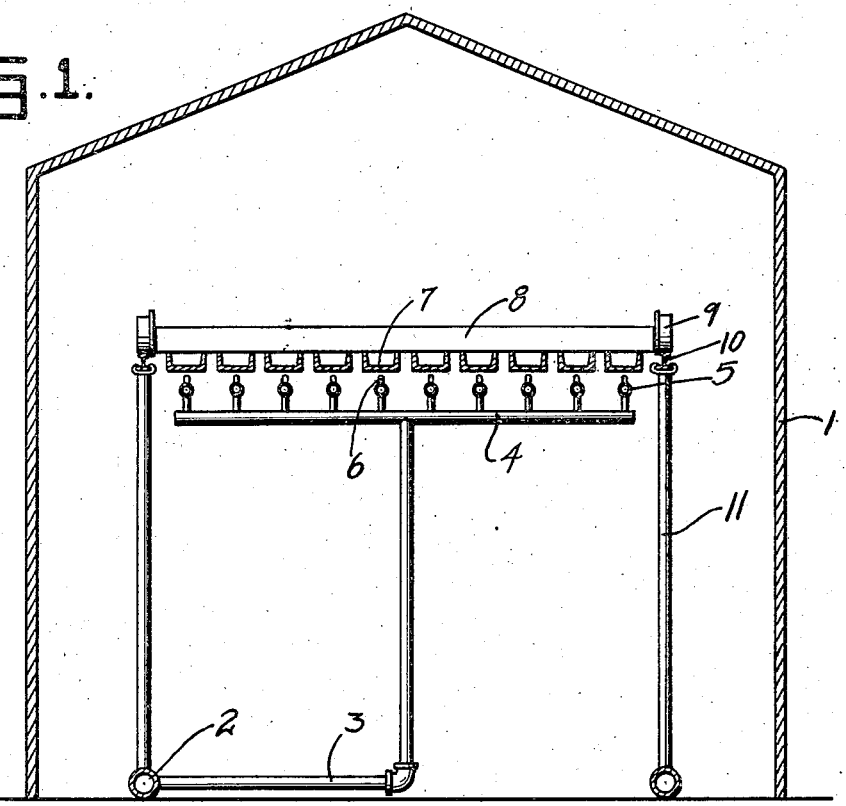
Figure 1 is a diagrammatic cross section of a hothouse and the apparatus customarily employed therein.
Figure 2:
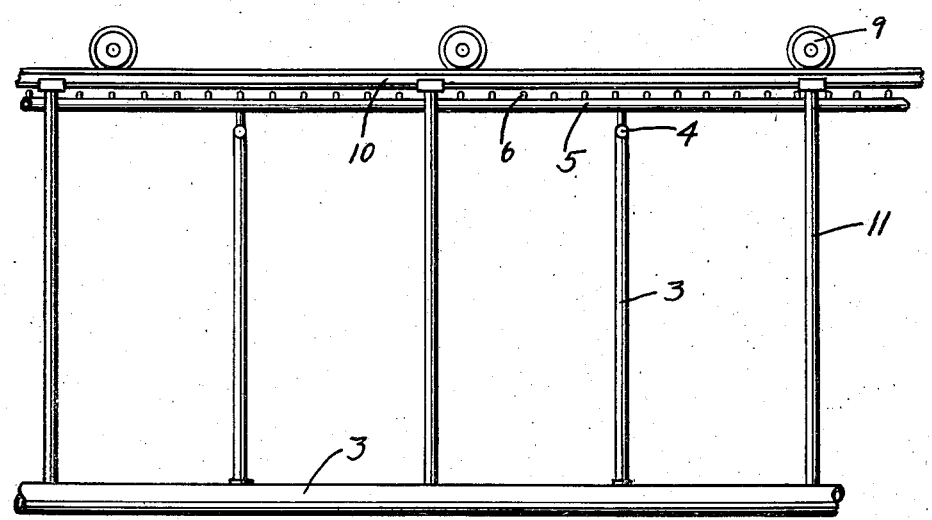
Figure 2 is a side elevation of a portion of the apparatus shown in Figure 1.

The hothouse, which is designated by the numeral 1, serves to enclose the gas distributing system, the burners, and the carbon black collecting apparatus. The gas distributing system consists of the gas mains 2 to which are connected at intervals the manifold feeders 3. Each of the manifold feeders is connected with the mid-portion of a manifold pipe 4, and each of these manifold pipes 4 is connected to a plurality of burner pipes 5. As will be clear from the drawing, the manifold pipes 4 extend transversely of the hothouse, whereas the burner pipes 5 extend longitudinally thereof. This arrangement may, of course, be altered in various constructions.

Each of the burner pipes 5 is provided at intervals with an upwardly directed burner tip 6, and when the apparatus is in operation a flame from each burner tip is adapted to impinge upon the under surface of one of the channel bars 7. The channel bars are supported by means of beams 8 and flanged wheels 9 upon rails 10 carried by a framework 11. The channels may, therefore, be moved longitudinally of the hothouse as the carbon black is deposited and collected in the well known manner.

It will be understood that the foregoing is only one of numerous forms of apparatus to which the present invention may be applied.

By the terms "sour gas" and "sour hydrocarbon gases" as employed herein and in the claims, I mean hydrocarbon gases containing sulphur compounds and which is of the character employed for making carbon black.

Iron burner pipes and disturbing systems as above mentioned are rapidly oxidized when used with sour gas in the production of carbon black. This oxidation takes place on the outside of the pipes under the action of the oxygen and the gases of combustion, and this naturally produces an outer surface on these pipes which readily absorbs heat. Also, the hydrogen sulphide in the gas attacks the iron of the inside of the pipe and forms a deposit which rapidly clogs the pipes. This deposit offers little or no protection to the metal beneath the deposit, and this metal continues to be rapidly attacked by the hydrogen sulphide. This attack appears to be due to the increased catalytic effect of the iron sulphide on the decomposition of the hydrocarbons, and the deposit within the pipes is composed not only of iron sulphide but also contains a substantial amount of free carbon. No carbon is deposited under similar conditions when sweet gas is being burned. The deposit is of such a nature that the hydrogen sulphide and the sulphur vapor formed by the thermal decomposition of the hydrogen sulphide can diffuse through and attack the metal beneath the deposit.

The importance of a material which will retain a heat reflecting surface in the presence of sour gas has been referred to. This is important because chemical activity is known to increase very rapidly with temperature, in many cases increasing more than one hundred per cent, for an increase of 10° centigrade in temperature, and it has been found that the deposit within the pipes of an iron distributing system is seldom uniform but is heaviest in the top of the pipe which has been exposed to direct radiation from the flame and from the heated surface upon which the flame is impinged. The use of a heat reflecting surface will naturally reduce the amount of radiant heat absorbed by the pipes of the distributing system and hence will serve to lower the temperature of such a system and decrease chemical activity. It has been found that highly polished iron, for example, is much more resistant to attack than the same metal in an unpolished condition, but in the case of iron this quality can not be retained because as soon as the attack becomes started the iron loses its heat reflecting surface.

Among the many attempts that have been made to supply a metal of satisfactory resistance for the distribution of sour gas under the conditions referred to, are the use of galvanized pipe, calorized pipe, and enameled pipe. Various ferrous alloys have also been tried. Each of these, however, presents certain objections. For example, the zinc of the galvanized pipe is volatile at the temperatures employed, the calorized pipe is very expensive and difficult to fabricate, and the enameled pipe is objectionable because of chipping of the enamel and because of the fact that where the holes for the burner tips are drilled the enamel is of course broken.

The various ferrous alloys have been found unsatisfactory either because they were too expensive or were not possessed of a sufficient amount of resistance to the chemical action of the sour gas.

I propose to construct distributing systems for sour gas of the natural alloys which are sold as commercially pure aluminum.

So far as I am aware no attempts have been made prior to this invention to employ aluminum as the material for distributing systems of this type. This is probably due to the general susceptibility of this material to chemical attack and particularly to its known susceptibility to attack by sulphur.

I have found, however, that despite the foregoing these alloys have very great resistance to attack by hot sour gas. The aluminum also retains its heat reflecting ability even in the presence of air and combustion gases up to temperatures approaching its melting point. For this reason a system of aluminum will in use remain several degrees cooler than a corresponding system of iron or a non-heat reflecting substance. Even though it is known to be attacked by sulphur, I have found that it is not corroded by hot sour gas even at temperatures at which substantial amounts of hydrogen sulphide are dissociated into hydrogen and sulphur.

In addition to the commercially pure aluminum, alloys of aluminum with small amounts of magnesium or copper have also been found to possess satisfactory resistance to corrosion by hot sour gas. The proportions of magnesium and copper or of magnesium or copper, as the case may be, are not critical, but it is preferable that the alloys consist principally of aluminum, and that the other elements be restricted to relatively small proportions. Also, various other alloys of aluminum will be found to be suitable for the purposes of this invention.

As an example of the results to be obtained from this invention, the following illustration is given:

A one inch standard pipe size commercial drawn tube of the natural alloy of aluminum was drilled and fitted with lava tips in the usual manner to serve as the burner pipe in a hot house for preparing carbon black by the well known channel process. A new iron pipe was fitted in a similar manner and placed in service next to the aluminum alloy pipe to serve as a control. The unit was operated on natural gas containing about 100 grains of hydrogen sulphide per 100 cubic feet. Temperatures measured by means of a thermocouple showed the aluminum pipe to be from 4 to 6° C. cooler than the iron pipe after the pipes had been in service for five weeks. After five months the iron pipe had been considerably attacked, but the aluminum pipe remained bright and was clean inside.

In another instance a number of ferrous alloys all of which resist tarnishing in air and in the combustion gases resulting from the burning of sour gas were, together with commercially pure aluminum, subjected to a mixture of six volumes of natural gas and one volume of hydrogen sulphide for seventy-two hours at 475° centigrade. The degree of attack on the various samples was determined by measuring the grams increase in weight per 100 cubic centimeters of the surface exposed. The various ferrous alloys all showed a substantial increase in weight indicating a substantial degree of chemical attack under the conditions stated. The usually chemically reactive commercial aluminum, however, showed no increase in weight whatever and showed itself to be substantially more resistant under the conditions stated than any of the ferrous alloys.

It has been found that although aluminum and its various alloys may be limited in usefulness under some circumstances by their melting point, commercial aluminum, for example, remains satisfactory at temperatures to which the gas distributing systems employed in the manufacture of carbon black are subjected and it is therefore generally useful for such systems in the manufacture of carbon black from sour gas by any impingement method such as the well known roller, plate or channel processes.

While seamless tubing has many advantages and is preferable in the fabrication of the distributing systems, it is within the scope of this invention to form distributing systems of aluminum or the other alloys indicated by casting, welding from sheet material or by any other suitable method.

In certain cases it may be found sufficient to construct only the most restricted portion of the distributing system or the part subjected to the highest temperature of aluminum or its alloys and a distributing system so constructed is considered to fall within the scope of this invention.

Having described my invention, I claim:

1. In an apparatus for the production of carbon black comprising a surface for receiving carbon black deposited by burning sour gas, a burner comprising burner tips adjacent said surface, a gas distributing system comprising conduits for distributing sour gas to said burner tips and a common enclosure for said surface, burner and gas distributing system, the improvement which consists in that the surfaces of the gas distributing system are composed principally of aluminum.

2. In an apparatus for the production of carbon black comprising a surface for receiving carbon black deposited by burning sour gas, a burner comprising burner tips adjacent said surface, a gas distributing system comprising conduits for distributing sour gas to said burner tips and a common enclosure for said surface, burner and gas distributing system, the improvement which consists in that the gas distributing system is composed principally of aluminum.

3. In an apparatus for the production of carbon black comprising a surface for receiving carbon black deposited by burning sour gas, a burner comprising burner tips adjacent said surface, a gas distributing system comprising conduits for distributing sour gas to said burner tips and a common enclosure for said surface, burner and gas distributing system, the improvement which consists in that the gas distributing system is composed of commercially pure aluminum.

IRA WILLIAMS.